United States Patent [19]

Botros

[11] 4,012,193

[45] Mar. 15, 1977

[54] BISAZOMETHINE DYES FOR METAL-MODIFIED POLYOLEFINS

[75] Inventor: Raouf Botros, Beech Creek, Pa.

[73] Assignee: American Color & Chemical Corporation, Charlotte, N.C.

[22] Filed: Sept. 2, 1975

[21] Appl. No.: 609,682

[52] U.S. Cl. .............................. 8/42 D; 260/146 R; 260/156; 260/194; 260/195; 260/196; 260/197; 260/198; 260/199; 260/202; 260/204; 260/205; 260/206; 260/207; 260/207.1; 260/240 G; 8/31

[51] Int. Cl.² .................. C09B 31/14; C09B 45/48

[58] Field of Search ............ 260/156, 146 R; 8/31, 8/42 D

[56] References Cited

UNITED STATES PATENTS

| 3,391,132 | 7/1968 | Beffa et al. | 260/146 R X |
| 3,617,179 | 11/1971 | Lewis | 8/42 D |

*Primary Examiner*—Charles F. Warren
*Attorney, Agent, or Firm*—Armstrong, Nikaido & Wegner

[57] ABSTRACT

Bisazomethine dyes of the general formula:

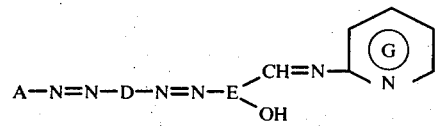

in which A and D are optionally substituted benzene or naphthalene nuclei, E is an optionally substituted salicylaldehyde or o-hydroxynaphthaldehyde nucleus and G is an optionally substituted 2-aminopyridine nucleus. Metal-modified polypropylene dyed with the bisazomethine dye has excellent fastness properties.

10 Claims, No Drawings

BISAZOMETHINE DYES FOR METAL-MODIFIED POLYOLEFINS

BACKGROUND OF THE INVENTION

1. Field of the Invention

The present invention relates to azo dyes useful in the dyeing of polyolefins and, in particular, to bisazomethine dyes which have utility in the dyeing of metal-modified, or metal-containing, polypropylene textile materials.

2. Description of the Prior Art

Polypropylene, because of its excellent mechanical strength, high elasticity and resistance to solvents, has found increased utility in recent years as filaments, yarns, fabrics, ropes and the like. To provide stability against degradation due to light and to provide reactive sites for dyes, the polypropylene generally contains metal or metal salts or chelates.

Chelatable dyes having specific utility in the dyeing of such metal-containing, or metal-modified, polypropylene are reported extensively in the literature.

Thus, for example, Siegrist et al., U.S. Pat. No. 3,399,027, discloses a process for dyeing polyolefins containing organic nickel chelate complexes with an aqueous dispersion of an azomethine dye. As the azomethine dyes there are disclosed dyes of the formulas:

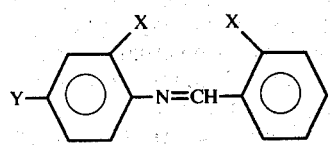 or 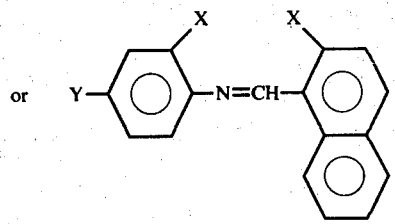

where
X is OH or COOH, and
Y is phenylazo or naphthylazo and may be para to X.

Wolfrum, U.S. Pat. No. 3,630,656, discloses a process for the dyeing and printing of metal-containing polypropylene with compounds of the general formula

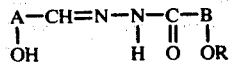

where A and B are optionally substituted benzene or naphthalene radicals and R is alkyl. It is disclosed that the substituent —CH=N— and the —OH group are attached to adjacent carbon atoms and that the substituent —OR and the substituent

are also attached to adjacent carbon atoms. A and B cannot simultaneously represent radicals of the benzene series.

Other common chelatable dyes are those containing as the chelating groups, o,o'-dihydroxyazo; o-hydroxy-o'-carboxyazo; o-hydroxy-o'-aminoazo and o-carboxy-o'-aminoazo groups. Although dyes of this type having complexing groups adjacent to the chromophoric portion bind strongly to the metal of metal-modified polypropylene, thus giving it excellent fastness to rubbing, washing and drycleaning, they usually produce dull colors. Additionally there is a drastic change in hue between the chelated and unchelated dye which can cause unevenness on the metallized fiber depending on the concentration of metal in the fiber. This difference in hue can adversely affect the application of these chelatable dyes to the pile of a metal-modified polypropylene carpet having a non-chelatable backing.

SUMMARY OF THE INVENTION

According to the present invention chelatable bisazo dyes having an azo-methine linkage are provided which show very little change in hue between the chelated and unchelated dye and which dye metal-modified polypropylene with outstanding fastness to light, rubbing, washing and drycleaning.

The dyes according to the invention may be represented by the general structure (I):

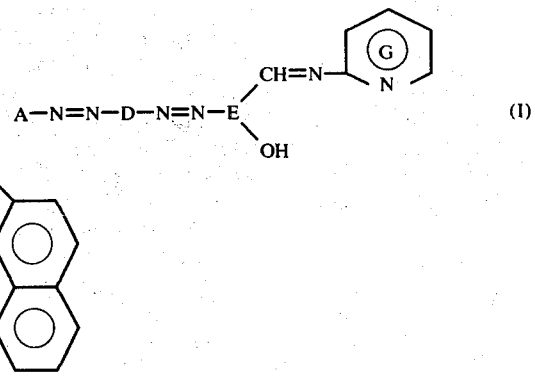

wherein
A is a benzene or naphthalene nucleus either of which is unsubstituted or substituted with: lower alkyl of 1–4 carbons; lower alkoxyl of 1–4 carbons; nitro; cyano; halogen; trifluoromethyl; hydroxyl; acyloxy; carboxyl; carbalkoxyl of 1–4 carbons in the alkyl moiety; acyl of 1–4 carbons in the alkyl moiety; benzoyl; acylamide, the acyl containing 1–4 carbons; benzamido; or carbamyl, the nitrogen being unsubstituted or singly or doubly substituted with lower alkyl of 1–4 carbons;

D is a benzene or naphthalene nucleus either of which is unsubstituted or substituted with lower alkyl of 1–4 carbons; lower alkoxyl of 1–4 carbons; beta-hydroxyethyloxy; beta-cyanoethyloxy or halogen;

E is a salicylaldehyde or an o-hydroxy-naphthaldehyde nucleus which is unsubstituted or substituted with lower alkyl of 1–4 carbons; lower alkoxyl of 1–4 carbons; halogen or cyano; and G is a 2-aminopyridine nucleus which is unsubstituted or substituted with lower alkyl of 1–4 carbons; lower alkoxyl of 1–4 carbons; nitro or halogen.

According to another embodiment of the invention there is provided metal-modified polyolefin textile material dyed with a dye of the general formula (I). The dyed polyolefin textile material has outstanding fastness properties.

DETAILED DESCRIPTION

According to the present invention there are provided dyes of the general formula (I)

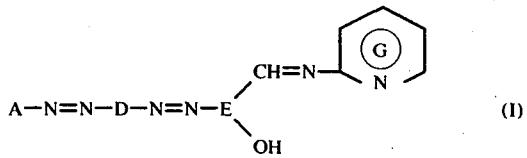

wherein
A is a benzene or a naphthalene nucleus, the benzene nucleus being unsibstituted or substituted with up to 3 substituents and the naphthalene nucleus being unsubstituted or substituted with up to 2 substituents, the substituents being independently selected from lower alkyl of 1–4 carbons; lower alkoxyl of 1–4 carbons; nitro; cyano; fluorine; chlorine; bromine; trifluoromethyl; hydroxyl; acyloxy (RCOO—, where R is alkyl of 1–4 carbons); carboxyl; carbalkoxyl (ROOC—, where R is alkyl of 1–4 carbons); acyl (RCO—, where R is alkyl of 1–4 carbons); benzoyl; acylamide (RCONH—, where R is alkyl of 1–4 carbons); benzamido (ArCONH—, where Ar is phenyl) or carbamyl, the nitrogen of which is unsubstituted or singly or double substituted with lower alkyl of 1–4 carbons;

D is a benzene nucleus which is unsubstituted or substituted with up to 2 substituents, or is a naphthalene nucleus which is unsubstituted or substituted with up to 2 substituents, the substituents being independently selected from lower alkyl of 1–4 carbons; lower alkoxyl of 1–4 carbons; beta-hydroxyethyloxy (—OCH$_2$CH$_2$OH); beta-cyanoethyloxy (—OCH$_2$CH$_2$CN); chlorine or bromine;

E is a salicylaldehyde or an o-hydroxy-naphthaldehyde nucleus which is unsubstituted or substituted with up to 2 substituents independently selected from lower alkyl of 1–4 carbons; lower alkoxyl of 1–4 carbons; cyano; fluorine; chlorine or bromine;

G is a 2-aminopyridine nucleus which is unsubstituted or substituted with up to 2 substituents independently selected from lower alkyl of 1–4 carbons; lower alkoxyl of 1–4 carbons; nitro; chlorine or bromine.

The bisazomethine dyes are obtained by condensing salicylaldehyde or o-hydroxy-naphthaldehyde, or their substituted derivatives, with a 2-aminopyridine in an organic solvent to form a coupler of the formula (II)

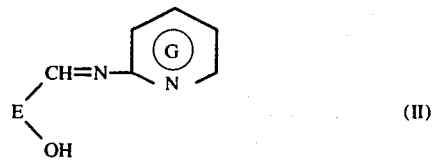

wherein E and G are as defined above. An aminoazo base of the formula (III)

wherein A and D are as defined above, is diazotized and coupled into the coupler (II). Alternatively, the dyes may be prepared by diazotizing the aminoazo base (III) and coupling into the salicylaldehyde or the o-hydroxy-naphthaldehyde and thereafter condensing the resultant bisazo compound with the 2-aminopyridine. (It is to be noted that reference hereinafter to the aminoazo base, salicylaldehyde, o-hydroxy-naphthaldehyde and 2-aminopyridine unless otherwise specified includes the unsubstituted and substituted compounds as defined above.)

Suitable aminoazo bases can be made by the rearrangement of diazoamino compounds (or triazenes) by well-established methods. Examples are p-aminoazobenzene and certain aminoazotoluenes. A general way to make the aminoazo base is to couple a diazotized aromatic amine into the same or different primary aromatic amine with an available coupling position. In certain cases, it is desirable to promote the coupling and to protect the primary amine by a group which can be removed by hydrolysis after coupling. The technique often used is the formation of the anilinomethane-sulfonic acid. Commercially available aminoazo bases coming within the definition of the formula (III), such as p-aminoazobenzene and o-tolylazo-o-toluidine, are of course suitable for preparing the dyes.

As the salicylaldehyde and o-hydroxy-naphthaldehyde suitable for preparing the azomethine dyes according to the present invention there may be used any of the compounds coming within the definition of the member E of the general formula (I). Substitution within the salicylaldehyde or the o-hydroxy-naphthaldehyde nucleus is believed to be limited only by the availability of a suitable site in the nucleus for coupling into the diazotized amine. It is of course understood that in the o-hydroxy-naphthaldehydes the hydroxy group is required to be ortho to the —CHO group. The choice of salicylaldehydes or o-hydroxy-naphthaldehydes will generally be limited only by economic and toxicological considerations with the commercially available species being preferred.

Suitable 2-aminopyridines include, for example, 2-aminopyridine, 2-amino-4-picoline, 2-amino-4-chloropyridine; 2-amino-3-bromo-5-nitropyridine and 2-amino-5-chloropyridine. Choice of the 2-aminopyridines is also believed to be limited only by practical considerations.

As the aromatic amines suitable for preparing the aminoazo base (III), there may be mentioned aniline-carboxylic acids, such as anthranilic acid, 5-chloro-2-aminobenzene-1-carboxylic acid, and 5-nitro-2-aminobenzene-1-carboxylic acid; hydroxy substituted amines such as 1-amino-2-hydroxybenzene, 2-hydroxy-4 or 5-nitroaniline and 2-hydroxy-5-chloroaniline; 4-nitroaniline; orthoanisidine; 3-chloro-o-toluidine, 4-nitro-3-chloro-o-toluidine; p-ethylaniline, p-butylaniline; 2-chloro-5-trifluoromethylaniline; 4-nitro-2-chloroaniline; 2,6-dichloroaniline, and 2,4-dimethoxyaniline; 1-naphthylamine; 1-amino-2-naphthol and 6-amino-2-naphthol-3-carboxylic acid. Other aromatic amines, of course, may be employed as starting materials. Choice of suitable aromatic amines will generally be based on practical considerations and desired properties of the dye.

The starting materials employed in the working examples that follow have been found to result in dyes that provide dyeings on metal-containing polypropylene with good fastness properties. Best results appear to be obtained with dyes prepared from aromatic amines substituted by alkyl, alkoxyl, halogen or trifluoromethyl substituents as defined above. Salicylaldehydes or o-hydroxy-naphthaldehydes substituted by alkyl, alkoxyl or halogen and 2-aminopyridine substituted with alkyl, alkoxyl or halogen, appear to result in dyes having the most commercially valuable properties with respect to the dyeing of Ni-containing polypropylene.

The condensation of the 2-aminopyridine with the salicylaldehyde or with the aromatic bisazo - salicylaldehyde derivative is carried out under conditions typical in the condensation reaction of aromatic amines and aldehydes. Thus, for example, the condensation may be carried out by refluxing the reactants in an organic solvent.

Diazotization of the aminoazo base and coupling of the diazotized base into the salicylaldehyde, o-hydroxy-naphthaldehyde or the coupler (II) are carried out in the usual way. Diazotization of the aromatic amine is effected by heating it in an aqueous solution of strong mineral acid such as hydrochloric acid, cooling the resulting solution to a temperature of 0°–10° C., and adding thereto a quantity of sodium nitrite slightly in excess of the stoichiometric requirement. An alternate method of diazotization involves dissolving sodium nitrite in concentrated sulfuric acid, heating to a temperature of about 60°–70° C., cooling the resulting solution to 0°–10° C. and adding thereto the aminoazo base.

The coupling reaction is carried out by adding the diazonium salt to a cold aqueous alkaline solution of the respective coupler. The mixture is allowed to react for 8–24 hours at room temperature and is thereafter filtered and washed with 10% sodium chloride solution. The product is then reslurried in water and made acidic to Congo Red paper with hydrochloric acid. The mixture is filtered and the cake is washed neutral with water. The desired azo product is thus obtained in the form of a wet cake.

The bisazomethine dyes (I) of the present invention have outstanding utility in the dyeing of metal-containing polyolefins and especially, nickel-containing polypropylene fiber materials. The dyed metal-modified polypropylene fiber materials according to the present invention include as the starting polypropylene fiber material any of the conventionally produced polypropylene materials which are generically designated in the textile art as "polypropylene fibers" and which contain a metal such as aluminum, nickel, zinc and the like either as such or in the form of its salts or chelates. The exact metal content of these fibers is not known but is believed to vary within the range of about 0.1 to about 2.0 weight percent. The metal improves the dyeing of the fiber materials and also serves to stabilize the materials against degradation due to light and heat. Nickel-containing polypropylene materials dyed with the structure of formula (I) have been shown to have excellent fastness properties. Such nickel-containing polypropylene materials are available commercially, for example, under the trademark Herculon.

To prepare the dye for application to the metal-modified fiber substrates, it must be suitably dispersed. This may be done by any of several well-known methods, e.g. milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired.

Dispersed pastes are made by wet milling the dye in conventional equipment in the presence of a dispersing agent, preferably sodium lignin sulfonate or sodium alkyl-naphthalene sulfonate. Various other commercially available dispersing agents, such as sodium salts of carboxylated polyelectrolytes and the naphthalene sulfonates, e.g. the condensation products of sulfonated naphthalene and formaldehyde, such as sodium, dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 10–50 percent by weight color content (pure color).

The disperse dyes are applied to the metal-containing polypropylene fibers or fabrics in a manner conventional in the dyeing of disperse dyestuffs and may be applied, for example, as neutral, acidic, or alkaline aqueous suspensions, with the use of dispersing agents, from a dyebath, preferably at temperatures of from 50° to 105° C. When temperatures of less than about 100° C. are employed, it is generally advantageous to add a customary carrier substance. These dyes may also be applied to the metal-containing polypropylene fabrics by a printing process. The printing paste is thickened with customary thickening agents and may also contain other additives conventionally used with printing pastes. The printing paste is expediently applied to the fabric by a printing block or a roller, whereupon the printed fabric is dried and steamed at a temperature between 105° and 110° C. After the dyeing or printing of the polypropylene material, it is treated with a hot aqueous soap solution. As suitable dyeing and printing techniques there may be mentioned those described in U.S. Pat. Nos. 3,399,027; 3,399,952; 3,492,078; 3,556,709 and 3,360,656.

Ni-containing polypropylene carpet printed with a dye of formula I shows excellent fastness properties. The fabric is colored in deep shades of desirable brightness, especially under artifical light. Besides a very good fastness to light, washing and rubbing, excellent fastness to dry cleaning is particularly noteworthy.

The invention may be better understood by referring to the following examples.

EXAMPLE I

A. Condensation product of 2-Aminopyridine with Salicylaldehyde

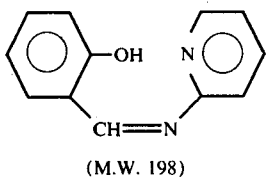

(M.W. 198)

A mixture of 61 g. salicylaldehyde and 50 g. 2-aminopyridine was refluxed in 50 g. denatured alcohol for 4 hours. The reaction mass was then cooled to 10° C and was filtered at this temperature. The product was washed with several portions of cold water and was dried in an oven at 50° C.

The product was obtained in 53.7% yield.

B. Preparation of the Dye

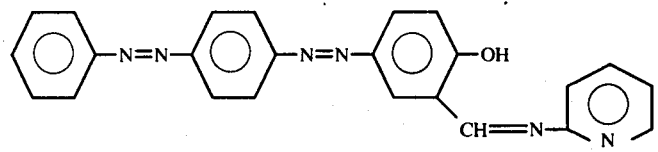

(M.W. 406)

A mixture of 39.4g. 4-aminoazobenzene in 80g. 32% hydrochloric acid and 450 ml. water was diazotized at 0° C with a solution of 14g. sodium nitrite dissolved in 100 ml. water. After stirring 2 hours at 0° C, excess nitrous acid was destroyed with sulfamic acid and the diazo solution was clarified. The clear diazo solution was added during 1 hour at 0° C to a solution of 39.4g. N-2-(o-hydroxybenzylidene)pyridine (obtained in A) in 3000 ml. water, 8g. sodium hydroxide flakes and 80g. sodium carbonate. After coupling was complete, the mixture was filtered and the cake was washed neutral with water.

Yield: 75g.
Theory: 81.2g. (92%)

The dispersed product, when applied to nickel-containing Herculon polypropylene fibers produced prints of brilliant golden orange shades having outstanding light fastness and excellent resistance to crocking and dry cleaning solvents.

The evaluation of the fastness of dyeings was conducted in accordance with the following AATCC methods:

Colorfastness to dry cleaning: AATCC Test Method 132–1973, p. 117 of the 1974 Technical Manual of the AATCC.

Colorfastness to crocking: AATCC Test Method 8–1972, p. 112 of the 1974 Technical Manual of the AATCC.

Colorfastness to light, Xenon-Arc Lamp: AATCC Test Method 16E–1974, p. 133 of the 1974 Technical Manual of the AATCC.

C. Dyeing of a Ni-containing Polypropylene from a Dyebath

Piece goods of "Herculon Type 40" an isotactic polypropylene containing a bis(p-alkylphenol)monosulfide nickel compound in the amount of about 0.12% calculated as metallic nickel by weight based on the weight of the polypropylene, are placed in a bath set at 35° C containing 1% Triton X-100 (iso-octyl-phenyl-polyethoxyethanol) based on weight of fiber, 1.0–1.5% acetic acid (pH 3–4) and a 1.0% (based on weight of fiber) dispersion of the dye from (B). After 5 minutes the temperature is raised to 95° C over a 30 minute period. The dyeing is continued at 95° C for an additional 45 minutes. The piece goods are removed from the dye bath, rinsed and soaped in 0.5% soap solution at 90° C for 10 minutes. The dyed fabrics are rinsed with water and dried. They are colored a deep brilliant golden orange shade of outstanding light fastness and excellent fastness to crocking and dry cleaning.

D. Dyeing of a Ni-containing polypropylene with a printing paste

A printing paste is prepared with 1000 parts of Tragacanth gum thickener (polysaccharides of galactose, fructose, xylose and arabinose with glucuronic acid), 5 parts acetic acid and a quantity of dispersed dye corresponding to 5 to 10 parts of a pure dye as obtained in (B). A fabric made of fibers of polypropylene containing nickel (Herculon Type 40) is printed on a roller. The fabric is dried and steamed for 8 minutes at 105°–110° C. The fabric is vigorously washed in a bath of soap at 90° C. A brilliant golden orange shade is obtained which possesses outstanding fastness to light and crocking and excellent fastness to the chlorinated solvents used in dry cleaning.

EXAMPLE II

A. Preparation of the Compound:

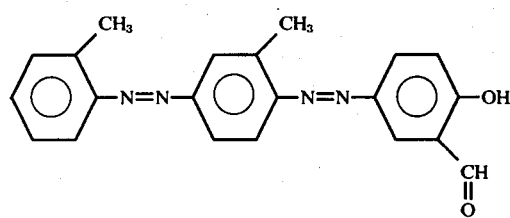

(M.W. 358)

A mixture of 101.4g. 4-o-tolylazo-o-toluidine in 157.5g. 32% hydrochloric acid and 900 ml. water was diazotized at 0° C with a solution of 31.5g. sodium nitrite dissolved in 250 ml. water. After stirring 2 hours at 0° C, excess nitrous acid was destroyed with sulfamic acid and the diazo solution was clarified. The clear diazo solution was added during 1 hour at 0° C to a solution of 54.9g. salicylaldehyde in 3000 ml. water, 18g. sodium hydroxide beads and 159g. sodium carbonate. After coupling was complete, the mixture was filtered and the cake was reslurried, without washing, into 2000 ml. water and was made acidic to Congo Red paper with hydrochloric acid. The mass was filtered and the cake was washed neutral with water. The product was dried in an oven at 80° C.

Yield: 130.7g.
Theory: 161.1g. (81.1%)

B. Condensation to form the Dye

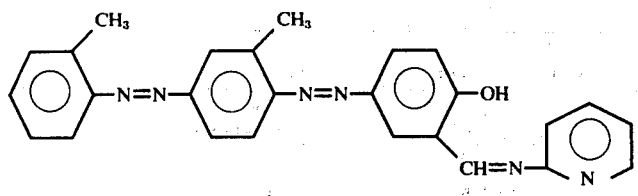

(M.W. 434)

A mixture of 17.9g. of the product obtained in (A) and 4.7g. 2-aminopyridine was heated in 75g. dimethylformamide at 80°–85° C until condensation was complete as shown by TLC. The reaction mass was drowned into 2000 ml. 20% aqueous sodium chloride. The product formed was filtered and washed with cold water.

Yield: 18.2g.
Theory: 21.7g. (83.7%)

When this dye was dispersed and applied to nickel-containing polypropylene material as in Ex. (I) (C), strong bright orange shades were obtained of outstanding light fastness and excellent resistance to crocking and dry cleaning.

EXAMPLE III

A. Preparation of the Compound

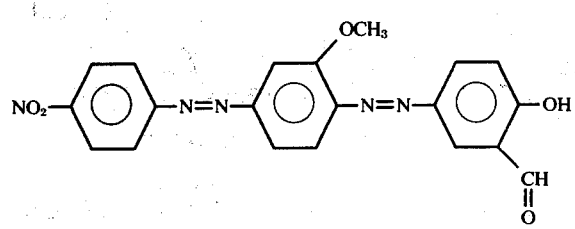

(M.W. 405)

The procedure of Example II was repeated with the exception that an equivalent quantity of 4'-nitro-3-methoxy-4-aminoazobenzene was used instead of the 4-o-tolylazo-o-toluidine. The above product was obtained in 78% yield.

B. Condensation to form the Dye

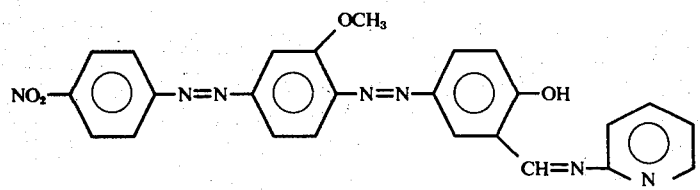

(M.W. 481)

A mixture of 40.5g. of the product obtained in (A) and 9.4g. 2-aminopyridine was heated in 150g. dimethylformamide at 80°–85° C until the starting material was no longer present as shown by TLC. The reaction mixture was drowned into 4000 ml. cold water. The product separated was filtered and washed with water.

Yield: 42g.
Theory: 48.1g. (87.3%)

The dye when suitably dispersed dyed nickel-containing polypropylene fibers in attractive yellowish brown shades of adequate light fastness and very good resistance to crocking and dry cleaning solvents.

EXAMPLES IV-XXXV

Following the procedures outlined in the foregoing examples, dyes are prepared as shown in Table I read in conjunction with the general formula:

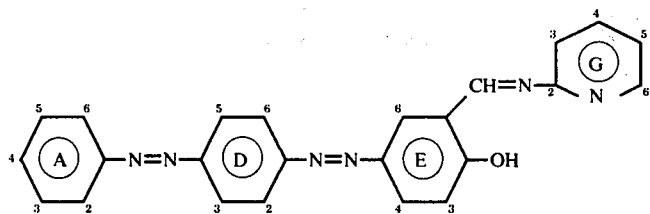

Ni-containing polypropylene is dyed with each compound to produce dyeings having good fastness properties and having the shades indicated in the table.

TABLE I

| Example | Substituents on Ring A | Substituents on Ring D | Substituents on Ring E | Substituents on Ring G | Shade |
|---|---|---|---|---|---|
| IV | 3-CH$_3$ | — | 4-OCH$_3$ | 4-Cl | Orange |
| V | 3-CH$_3$ | 3-CH$_3$ | 3-C$_2$H$_5$ | 4,6-diCl | Yellowish Brown |
| VI | 2,4-di-CH$_3$ | 2-CH$_3$ | 3-Cl | 5-OC$_2$H$_5$ | Do |
| VII | 2,4-di-CH$_3$ | 2,5-di-CH$_3$ | 3-CN | 6-Br | Do |
| VIII | 4-NO$_2$ | 2-CH$_3$ | 3-F | 5-Cl | Brown |
| IX | 3-NO$_2$ | — | 3,4-di-OCH$_3$ | — | Orange |
| X | 4-COOH | — | 4,6-di-OC$_2$H$_5$ | — | Do |
| XI | 2,3-Benz | — | — | 4,6-diCl | Reddish Brown |
| XII | 4-NO$_2$ | 2,3-Benz | — | 6-OC$_2$H$_5$ | Do |
| XIII | — | 2,3-Benz | — | — | Brown |
| XIV | —COOC$_2$H$_5$ | 2-CH$_3$ | 6-OCH$_3$ | — | Bright Orange |
| XV | 2,5-diCl | — | 3-Br | 3-Br;5-NO$_2$ | Do |
| XVI | 2-CH$_3$,4-Cl | — | 3-n-C$_3$H$_7$ | — | Golden Orange |
| XVII | 4-C$_2$H$_5$ | 3-CH$_3$ | — | 5-CH$_3$ | Brilliant Yellowish Orange |
| XVIII | 3-Cl,2-CH$_3$ | — | 3,4-di-OCH$_3$ | — | Do |
| XIX | 4-n-C$_4$H$_9$ | 2-CH$_3$ | — | 5-Cl | Bright Yellowish Brown |
| XX | — | 2,3-Benz | — | — | Brown |
| XXI | 4-NO$_2$ | 2,3-Benz | — | — | Do |
| XXII | 2-CF$_3$ | 2,5-di-CH$_3$ | 3-C$_2$H$_5$ | 3,5-di-Br | Brilliant Orange |
| XXIII | 2-COOCH$_3$ | 3-CH$_3$ | 4,6-di-OC$_2$H$_5$ | — | Do |
| XXIV | 4-OCH$_3$ | 2,3-Benz | — | — | Yellowish Brown |
| XXV | 2-Cl,5-CF$_3$ | — | 3-CN | — | Bright Orange |
| XXVI | 4-CN;2,5-di-OCH$_3$ | 2,3-di-Cl | — | — | Do |
| XXVII | 4-CH$_3$CO | — | 6-CH$_3$ | 6-Br | Do |
| XXVIII | 2-OCH$_3$ | 2,5-di-OCH$_3$ | — | — | Golden Orange |
| XXIX | 4-NHCOCH$_3$ | — | 3-Cl | 3-C$_2$H$_5$ | Pale Orange |
| XXX | 4-N(C$_2$H$_4$OH)$_2$ | — | — | 4-isoBu | Weak Orange |
| XXXI | 4-NO$_2$;2,6-di-Cl | 2,5-di-OCH$_3$ | — | — | Weak Brown |
| XXXII | 4-CH$_3$ | 2,5-di-CH$_3$ | 6-OCH$_3$ | — | Orange |
| XXXIII | 3-NHCOCH$_3$ | 3-CH$_3$ | — | — | Yellowish Orange |
| XXXIV | 4-NO$_2$ | 2,5-di-OC$_2$H$_5$ | — | 3-CH$_3$ | Brown |
| XXXV | 4-C$_6$H$_5$CO | — | 3-F | 3-CH$_3$ | Do |

What is claimed is:

1. A bisazomethine dye of the formula

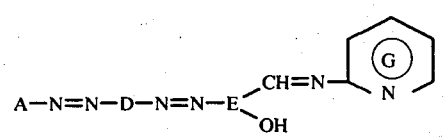

wherein:

A is a benzene or naphthalene nucleus, the benzene nucleus being unsubstituted or substituted with up to 3 substituents and the naphthalene nucleus being unsubstituted or substituted with up to 2 substituents, said substituents being independently selected from alkyl of 1–4 carbons; alkoxyl of 1–4 carbons; nitro; cyano; fluorine;; chlorine; bromine; trifluoromethyl; hydroxyl; RCOO—, where R is alkyl of 1–4 carbons; carboxyl; ROOC—, where R is alkyl of 1–4 carbons; RCO—, where R is alkyl of 1–4 carbons; benzoyl; RCONH—, where R is alkyl of 1–4 carbons; ArCONH—, where Ar is phenyl; or carbamyl, the nitrogen of which is unsubstituted or singly or doubly substituted with alkyl of 1–4 carbons;

D is a benzene or naphthalene nucleus, the benzene nucleus being unsubstituted or substituted with up to 2 substituents and the naphthalene nucleus being unsubstituted or substituted with up to 2 substituents, said substituents being independently selected from alkyl of 1–4 carbons; alkoxyl of 1–4 carbons; —OCH$_2$CH$_2$OH; —OCH$_2$CH$_2$CN; chlorine or bromine;

E is a salicylaldehyde or an o-hydroxy-naphthaldehyde nucleus each nucleus being unsubstituted or substituted with up to 2 substituents independently selected from alkyl of 1–4 carbons; alkoxy of 1–4 carbons; cyano; fluorine; chlorine or bromine; and G is a 2-aminopyridine nucleus which is unsubstituted or substituted with up to 2 substituents independently selected from alkyl of 1–4 carbons; alkoxyl of 1–4 carbons; nitro; chlorine or bromine.

2. The dye of claim 1 of the formula

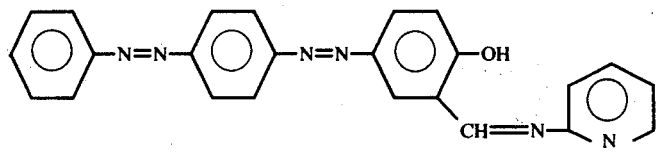

(M.W. 406)

3. The dye of claim 1 of the formula

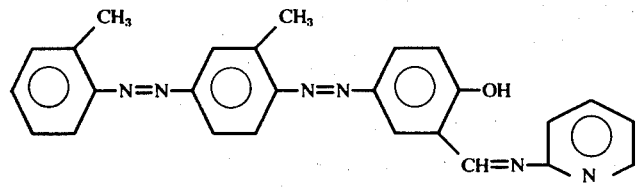

4. The dye of claim 1 of the formula

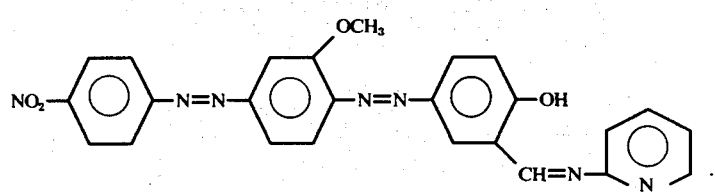

5. The dye of claim 1 wherein the substituents for A are selected from the group consisting of alkyl of 1–4 carbons; alkoxyl of 1–4 carbons; fluorine; chlorine; bromine and trifluoromethyl; the substituents for D are selected from the group consisting of alkyl of 1–4 carbons, alkoxyl of 1–4 carbons; chlorine; and bromine; the substituents for E are selected from the group consisting of alkyl of 1–4 carbons; alkoxyl of 1–4 carbons; fluorine; chlorine and bromine; and the substituents for G are selected from the group consisting of alkyl of 1–4 carbons; alkoxyl of 1–4 carbons; fluorine; chlorine and bromine.

6. Metal-containing polyolefin dyed with a bisazomethine dye of the formula

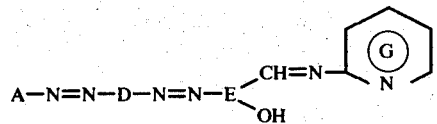

wherein

A is a benzene or naphthalene nucleus, the benzene nucleus being unsubstituted or substituted with up to 3 substituents and the naphthalene nucleus being unsubstituted or substituted with up to 2 substituents, said substituents being independently selected from alkyl of 1–4 carbons; alkoxyl of 1–4 carbons; nitro; cyano; fluorine; chlorine; bromine; trifluoromethyl; hydroxyl; RCOO—, where R is alkyl of 1–4 carbons; carboxyl; ROOC—, where R is alkyl of 1–4 carbons; RCO—, where R is alkyl of 1–4 carbons; benzoyl; RCONH—, where R is alkyl of 1–4 carbons; ArCONH—, where Ar is phenyl; or carbamyl, the nitrogen of which is unsubstituted or singly or doubly substituted with alkyl of 1–4 carbons;

D is a benzene or naphthalene nucleus, the benzene nucleus being unsubstituted or substituted with up to 2 substituents and the naphthalene nucleus being unsubstituted or substituted with up to 2 substituents, said substituents being independently selected from alkyl of 1–4 carbons; lower alkoxyl of 1–4 carbons; —OCH$_2$CH$_2$OH; —OCH$_2$CH$_2$CN; chlorine or bromine;

E is a salicylaldehyde or an o-hydroxy-naphthaldehyde nucleus each nucleus being unsubstituted or substituted with up to 2 substituents independently selected from alkyl of 1–4 carbons; alkoxyl of 1–4 carbons; cyano; fluorine; chlorine or bromine; and G is a 2-aminopyridine nucleus which is unsubstituted or substituted with up to 2 substituents independently selected from alkyl of 1–4 carbons; alkoxyl of 1–4 carbons; nitro; chlorine or bromine.

7. The dyed polyolefin of claim 6 where the polyolefin is Ni-containing polypropylene.

8. The dyed Ni-containing polypropylene of claim 7 wherein the bisazomethine dye is

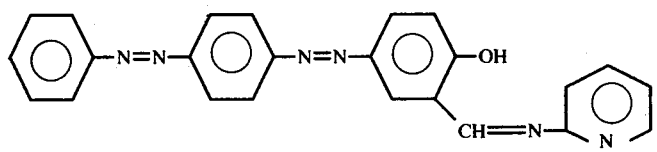
9. The dyed Ni-containing polypropylene of claim 7 wherein the bisazomethine dye is
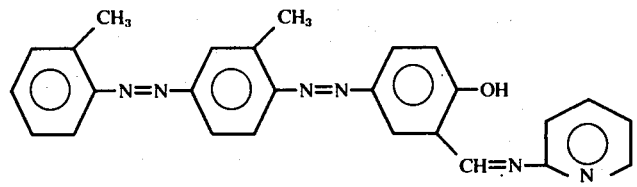
10. The dyed Ni-containing polypropylene of claim 7 wherein the bisazomethine dye is
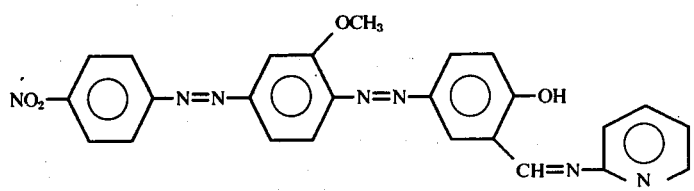
\* \* \* \* \*